United States Patent [19]

Foucras et al.

[11] 4,346,004

[45] Aug. 24, 1982

[54] SECURING MEANS FOR THE LEAKPROOF MOUNTING OF A SEMI-PERMEABLE MEMBRANE TO A SUPPORT PLATE

[75] Inventors: Jacques Foucras, Bron; Georges Rodet, Communay, both of France

[73] Assignee: Rhone-Poulenc Industries, Paris, France

[21] Appl. No.: 215,325

[22] Filed: Dec. 11, 1980

[30] Foreign Application Priority Data

Dec. 13, 1979 [FR] France ............................. 79 31187

[51] Int. Cl.³ .......................................... B01D 31/00
[52] U.S. Cl. ............................... 210/232; 210/321.1; 210/433.2
[58] Field of Search ..................... 210/232, 321, 433.2, 210/433 M, 450, 541; 277/9, 12, 102, 105, 116.4, 116.8, 117, 118, 166; 55/158, 493, 503

[56] References Cited

U.S. PATENT DOCUMENTS 4,165,082 8/1979 Foucras et al. .............. 210/321.1 X

OTHER PUBLICATIONS

Sourirajan, S., Reverse Osmosis, Academic Press, N.Y., 1970, p. 444.

*Primary Examiner*—Benoit Castel
*Assistant Examiner*—David R. Sadowski
*Attorney, Agent, or Firm*—Burns, Doane, Swecker & Mathis

[57] ABSTRACT

A device is provided for the leaktight securing of semi-permeable membranes to opposite faces and around each orifice of a membrane support plate of a separatory apparatus which separates by selective permeability. Said device comprises two stamped metal rings which maintain sealing pressure on the membranes against the support plate and are attached to one another in a leaktight fashion by means of a sealing means situated between them. A separatory apparatus comprising support plates fitted with the above device is also provided.

17 Claims, 8 Drawing Figures

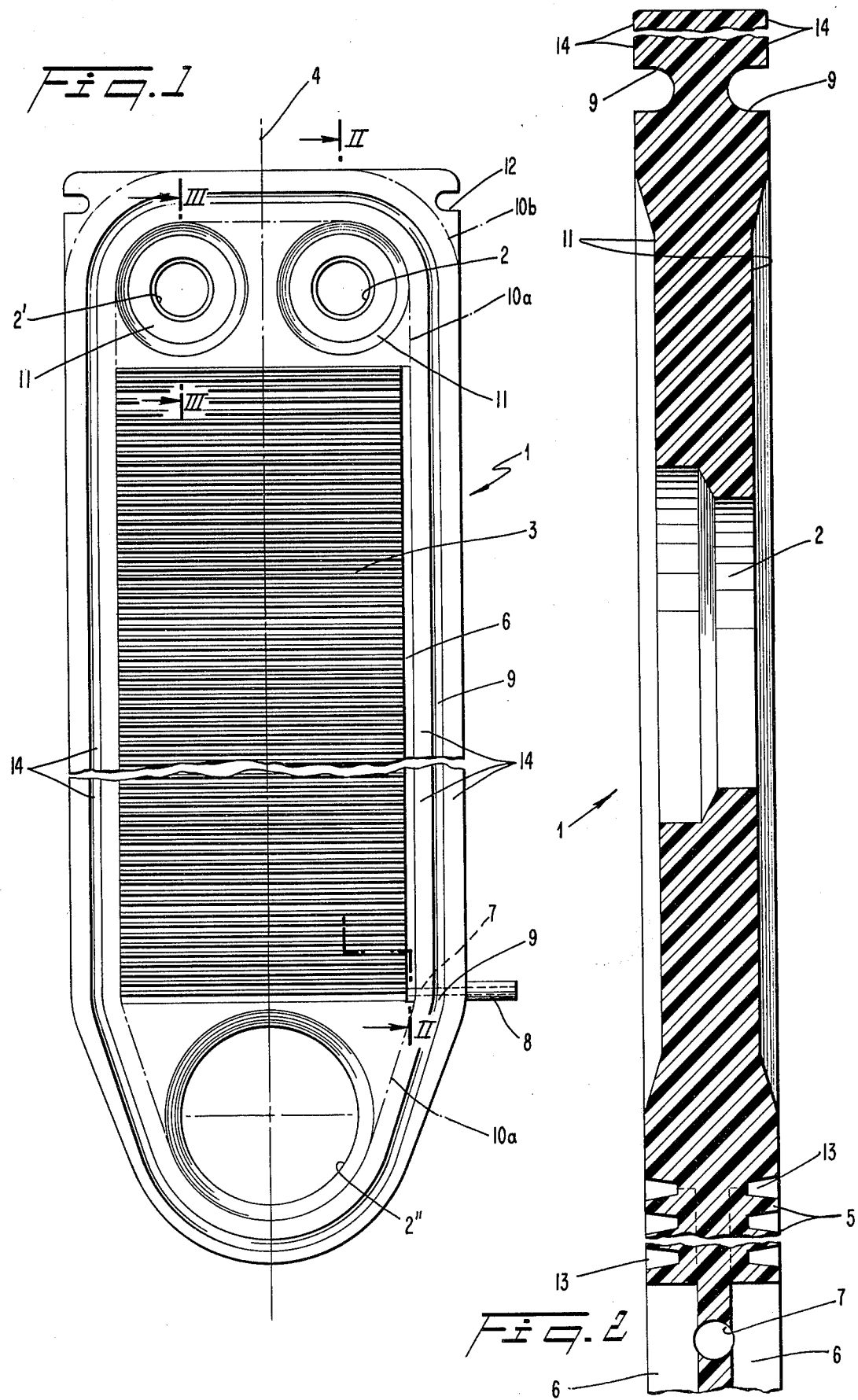

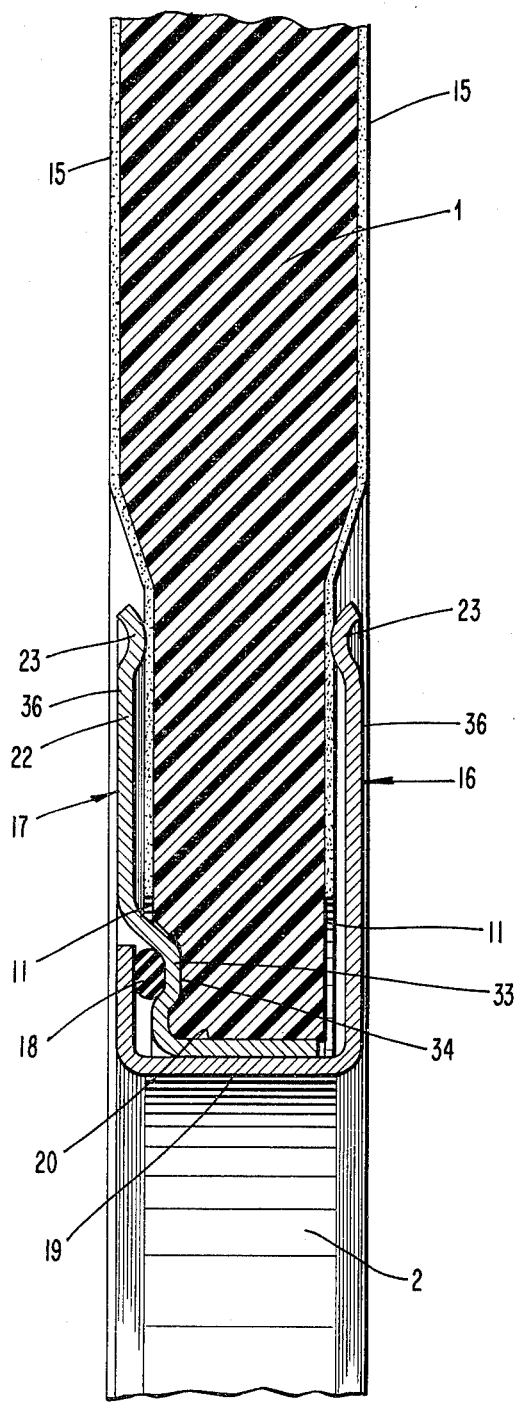
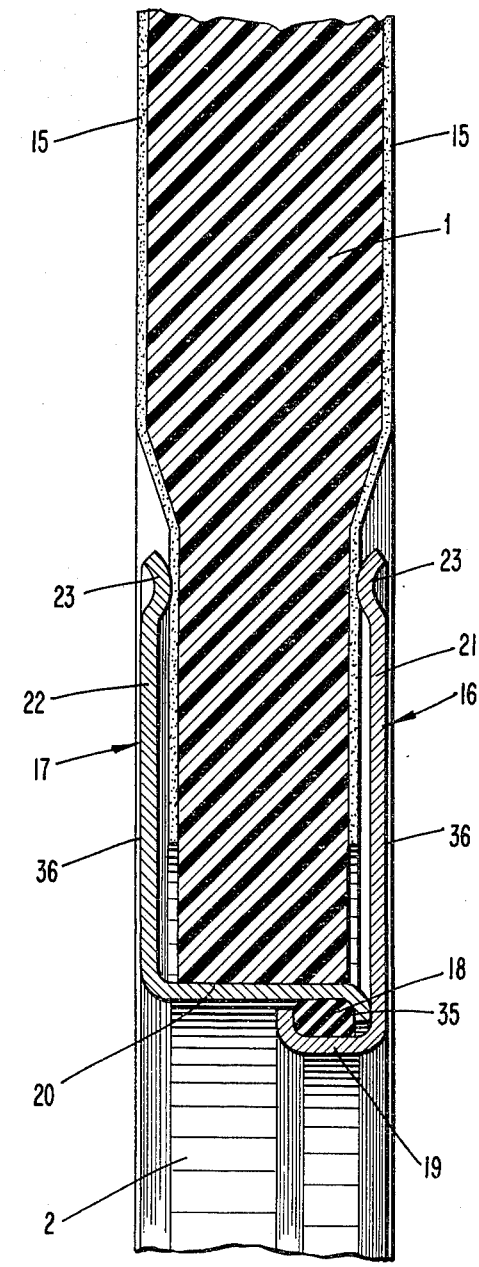

SECURING MEANS FOR THE LEAKPROOF MOUNTING OF A SEMI-PERMEABLE MEMBRANE TO A SUPPORT PLATE

BACKGROUND OF THE PRESENT INVENTION

1. Field of the Invention

The present invention relates to a device for the leaktight attachment of semi-permeable membranes to the support plates of a separatory apparatus which separates by selective permeability.

2. Description of the Prior Art

Separatory apparatuses comprised of a plurality of planar, semi-permeable membranes and which separate fluid by selective permeability are known to this art; compare U.S. Pat. No. 3,831,763. These apparatuses comprise sub-units which are formed, in particular, by the juxtaposition of a number of membrane support plates, with the pressurized fluid to be treated, which is generally liquid, circulating in parallel between the membranes of the successive support plates (of one sub-unit), which are provided with generally elongated orifices towards each of their ends for the passage of the fluid. This fluid circulates in series from one sub-unit to the other due to the presence of so-called intermediate plates which only have an orifice towards one of their ends. The fluid which has passed through the membranes is recovered individually for each support plate, on the edge of the latter, by virtue of at least one tube provided for this purpose.

U.S. Pat. No. 3,809,246 has a proposed a solution to the problem of keeping the membranes leaktight near the orifices, for the passage of the fluid to be treated, of each support plate. This solution consists of keeping the transverse ends of the membrane in an elongated opening close to the orifice for the passage of the fluid to be treated by means of a detachable device which keeps the membrane leaktight on the inner wall of this opening. It has been shown that this detachable device can, under certain conditions of use of the apparatus, and in particular for high rates of circulation of the fluid to be treated, advantageously be replaced by a device, which is preferably of circular shape, at the center of which circulates the fluid to be treated.

A device of circular shape for the leaktight attachment of membranes to a support plate is already known, but it exhibits the disadvantage that it is not itself fixed to the support plate, which requires that the adjacent devices of two consecutive support plates be held in contact with one another, for example, by virtue of cams or peripheral ridges, in which case the membranes are only kept leaktight on the support plates when the apparatus is tightened up, e.g., clamped. This embodiment of the membrane-fixing device, therefore, only makes it possible to ensure the leaktight attachment of the membranes to each opposite face of a support plate and around the orifice provided for the passage of the fluid to be treated when the apparatus itself is tightened-up. This embodiment of the attaching devices, therefore, exhibits the disadvantage that it renders the leaktightness of the membranes on each support plate dependent on the tightening of the apparatus itself, which tightening must also make it possible to ensure the peripheral leaktightness between two consecutive membrane support plates.

A device which does not exhibit the disadvantages of the aforediscussed device is described in U.S. Pat. No. 4,165,082. This device comprises two rings which are fixed to one another, after they have been arranged in the orifice of the support plate, by bringing them together axially until the edge of each of them presses the membrane in a leaktight manner against each face of the said support plate. These rings are generally made of a rigid macromolecular material and are advantageously of an injection-molded substance. It would, however, be advantageous to make a suitable device from a material possessing superior temperature stability and resistance to chemical agents.

SUMMARY OF THE INVENTION

Accordingly, it is a major object of the present invention to provide a device which does not exhibit the aforenoted disadvantages of the devices of the prior art and which has improved properties, particularly with regard to its resistance to chemical agents and its temperature stability. By the present invention, such a device for the leaktight attachment of semi-permeable membranes to each opposite face, and around each passage orifice for the fluid to be treated, of a membrane support plate of a separatory apparatus which separates by selective permeability has now been found. The said device, the subject of the present invention, is characterized in that it comprises two stamped metal rings pressing the membranes against the corresponding support plate, the said rings being fixed to one another in a leaktight manner via a seal or gasket arranged between them.

BRIEF DESCRIPTION OF THE DRAWINGS

The device according to the present invention will be more clearly understood upon reference to the attached drawings, which illustrate, by way of example only and with no fixed scale, certain preferred embodiments of the subject device.

FIG. 1 is an elevational front view of a membrane support plate which can be equipped by the device according to the present invention;

FIG. 2 is a cross-sectional view taken along the line II—II of FIG. 1;

FIG. 5 is a partial sectional view which illustrates another embodiment of the device according to the present invention;

FIG. 6 is, similarly, a partial sectional view illustrating another embodiment of the device according to the present invention.

DETAILED DESCRIPTION OF THE INVENTION

Figures 3, 3A, 3B:
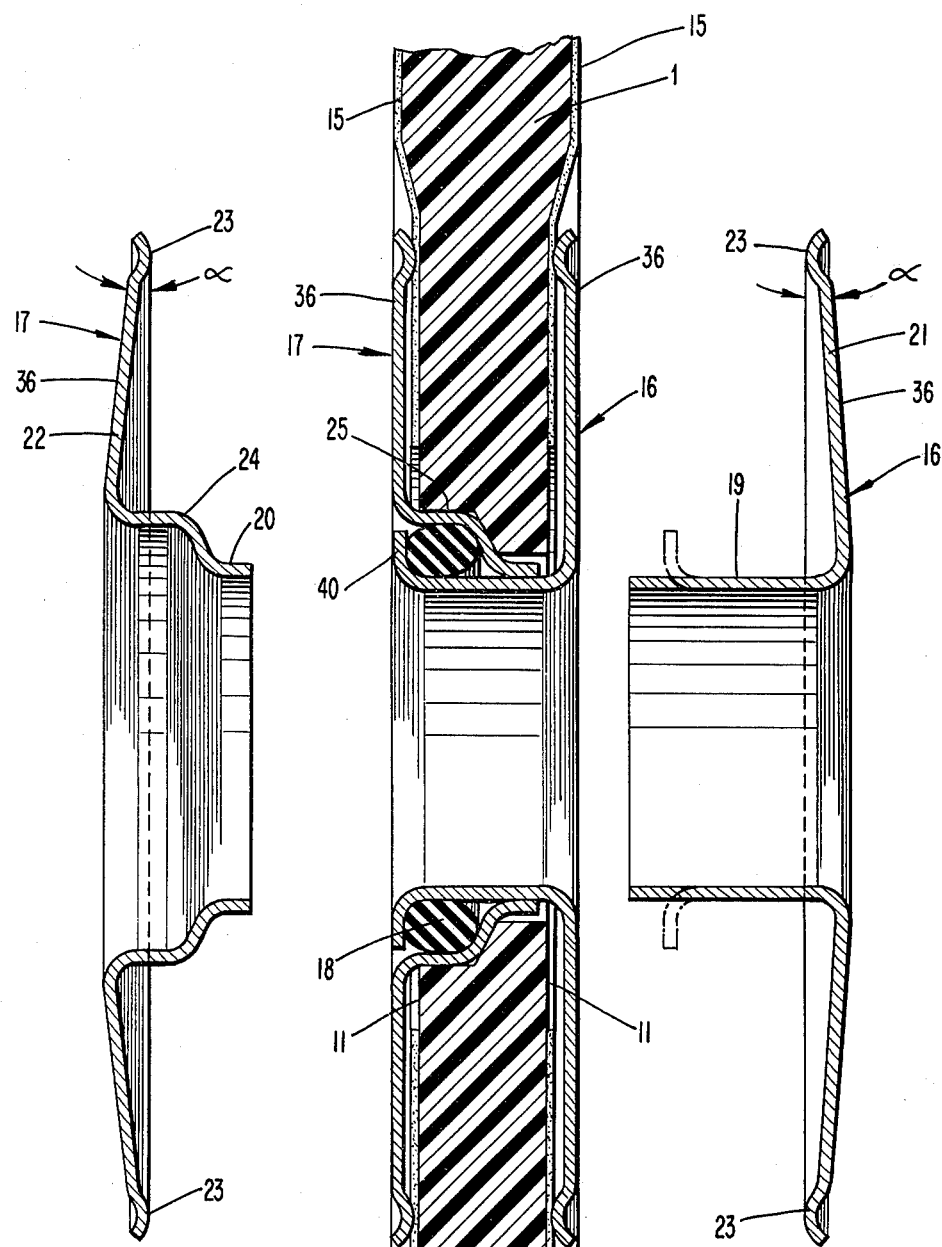
FIG. 3 is a sectional view of a device according to the present invention in position on a support plate and taken along the line III—III of FIG. 1.
FIG. 3a is a cross-sectional view of the female ring of FIG. 3 before it is mounted on the support plate.
FIG. 3b is a cross-sectional view of the male ring of FIG. 3 before it is mounted on the support plate.

An example of a support plate to which the device according to the present invention is capable of attaching membranes in a leaktight manner is shown in FIGS. 1 and 2. A plate 1 of this type, which is generally of an elongated shape, possesses at least one orifice towards each of its ends for the passage of the fluid to be treated. In the embodiment of FIG. 1, the plate 1 possesses two orifices 2 and 2' at its upper extremity while comprising only one orifice 2" in its lower extremity. Of course, the support plates which can be equipped by the devices according to the present invention can have the same number of orifices at each end.

Between the orifices at each end of the plate, and on each face of the plate, there is a dish 3 or zone which comprises ribs 5 perpendicular to the longitudinal axis 4 of the support plate 1. These ribs 5 can have a triangular cross-section, as shown schematically in FIG. 2, however, these ribs 5 can be advantageously of trapezoidal cross-section (as is shown on an enlarged scale in FIG. 3). The ribs 5 can optionally comprise anchoring means, for example ridges, as is described in the French Pat. No. 2,400,380. The ribs 5 of each dish 3 are covered by a membrane, and the fluid which passes through the membranes, which is generally liquid, circulates in the grooves or channels 13 formed between the successive ribs 5. The fluid is collected in each dish 3 by means of at least one longitudinal groove 6 in communication with each groove 13, each groove 6 also advantageously being in communication with a passage 7 which is inside the plate 1 and permits the discharge of the said fluid to the outside of the plate 1, for example, by means of a tube 8.

Two consecutive or adjacent support plates 1 of an apparatus are preferably spaced apart from one another by means of a flat seal or gasket which ensures the peripheral leaktightness seal between the two plates and defines the thickness of the layer of fluid to be treated under pressure, which fluid circulates between the membranes of two consecutive support plates 1. The support plate 1 shown in FIGS. 1 and 2 has, on the edge 14 of each of its faces, a peripheral channel 9, which is optionally discontinuous, in which a corresponding extra thickness or ridge of the flat seal separating two support plates is positioned; this ensures a better positioning and a better resistance of the flat seal to the action of the fluid to be treated, which circulates under pressure between the membranes of two adjacent support plates. A flat seal or gasket is not shown in FIG. 1, but the broken lines 10a and 10b show its outline and positioning on the support plate 1, the outer contour of the seal thus having essentially the same outline as the contour of the support plate (line 10b), while its inner contour (line 10a) essentially corresponds to the width of the dish 3 and passes near the orifices 2, 2' and 2". On a support plate 1, each membrane (not shown) has a contour which essentially corresponds to that of the channel 9, and openings which correspond to the orifices 2, 2' and 2" for the passage of the fluid to be treated. In general, the membranes are cut in such a way that they rest on a peripheral flaring or widening 11 near the orifices which is advantageously provided on each face of a support plate 1. The notches 12 provided in the upper portion of the support plate 1 correspond to a means for holding the said support plates which are generally employed in a separatory apparatus in the vertical position, the tube 8 for the discharge of the fluid which has passed through the membranes then being advantageously placed towards the lower portion of each support plate.

The aforedescribed support plate 1 corresponds to a preferred embodiment of such a plate which can be equipped with the device according to the present invention. A support plate 1, of this type can, for example, be made of plastic and obtained by injection-molding under pressure. However, it must be understood that the support plates which can be equipped with the device according to the present invention can also be machined plates, and can be subject to numerous structural modifications as compared with the aforedescribed plate. Thus, it is to be emphasized that the aforedescribed support plate 1 serves only to provide a clearer understanding of how, and in which technical field the device according to the present invention is and can be used. More generally, the device according to the present invention is of value whenever it is desired to fix a membrane to each face of a support plate in a leaktight manner, and whenever the latter has at least one orifice passing through it for the passage of a fluid which must not circulate between the membranes of the plate in question.

As regards the orifices 2, 2' and 2" of the plate 1, they have been shown as having a circular shape, this corresponding to a preferred embodiment. However, these orifices can optionally be elliptical or have other shapes, for example, a square or rectangular shape with rounded corners.

Moreover, the device according to the present invention, which is described in detail infra for use with plates having orifices of circular cross-section, can of course be adapted to the particular shape of each orifice of a support plate.

FIG. 3 shows a preferred embodiment of a device according to the present invention, which device achieves the leaktight attachment of semi-permeable membranes 15 to each face of a support plate 1 as described previously. The device comprises a male ring 16 and a female ring 17, which are fitted together in an orifice for the passage of the fluid to be treated of the support plate, and are attached to one another in a leaktight manner via a sealing means 18. FIG. 3a shows the female ring 17 and FIG. 3b shows the male ring 16 prior to being attached in the orifice of the support plate 1. The two rings 16 and 17 are made of a metallic material, are preferably stamped, and are generally in the form of an alloy, and are most preferably made of stainless steel. The rings should also be of a consistent thickness throughout.

Both rings comprise a cylindrical portion 19 and 20 and a rim or flange 21 and 22, the circular periphery of which terminates in an internal rib 23, as shown in FIGS. 3a and 3b. These ribs 23 hold the membranes 15 against the support plate in a leaktight manner upon attaching the device to the plate. Preferably, prior to mounting the rings 16 and 17 on a support plate, the flanges 21 and 22 thereof form an angle 60 of between 2° and 8°, and more preferably between 3° and 6°, relative to that face of the support plate against which they are to press a membrane. The angle α is preferably such that after the rings have been mounted on a support plate, the ribs 23 bear on the membranes with the flanges 21 and 22 being deformed within the elastic limit of the metallic material used so that after detachment of the device the rings retain the initial angle α.

The female ring 17 can comprise a second cylindrical portion 24 of enlarged diameter. This cylindrical portion or notch 24 is directly connected to the flange 22 of the said female ring 17. In said notch is located an O-ring seal 18. Moreover, the orifice of the support plate 1 comprises a notch 25 of an enlarged diameter, which corresponds to the cylindrical portion 24 of enlarged diameter in the female ring 17. This notch 25 in the orifice of the support plate is directly joined to the flaring or widening 11 of the plate.

The external diameter of the cylindrical portion 20 of the female ring 17 is approximately of the same dimension as the external diameter of the orifice of the support plate, while the internal diameter of the cylindrical portion 20 of the female ring is approximately the same as the external diameter of the cylindrical portion 19 of the male ring 16. Furthermore, the length of the cylindrical portion 19 of the male ring 16 can be such that after same has been joined to sealing means 18, its flanged or bent part 40 is essentially in the same plane as the flange 22 of the female ring 17. Moreover, the flaring 11 of the support plate is such that after the device has been mounted, the outside face 36 of the flange 21 and 22 of each ring 16 and 17 is approximately in the same plane as the membrane on each dish 3 of the plate.

Although the aforedescribed device according to the present invention has been shown in FIG. 3 with an O-ring sealing means (somewhat deformed after the attachment of the device), this sealing means or gasket can have any other cross-section, in particular, for example, a rectangular or square cross-section. Suitable seals 18 can generally be made of nitrile rubber, ethylene/propylene rubber, butyl rubber, butadiene/styrene rubber, chloroprene rubber, fluorocarbon rubber, silicone rubber, fluorosilicone rubber, polyacrylic rubber, polyurethane rubber or the like.

Figure 4:
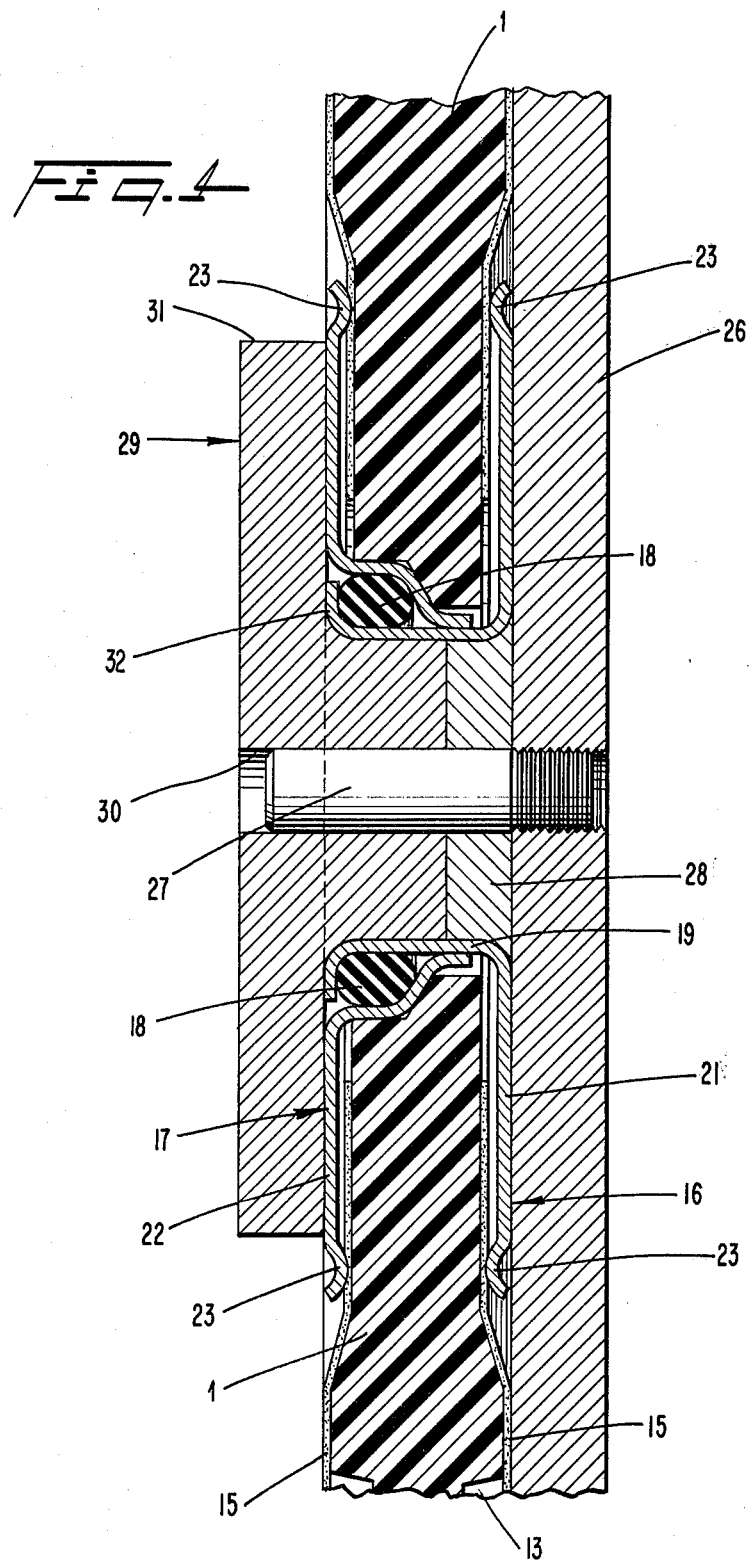
FIG. 4 is a sectional view depicting a method of mounting the device of FIG. 3 on a support plate.

The procedure for mounting the device for the leaktight attachment of membranes to a support plate, such as that shown in FIG. 3, is advantageously, for example, as follows: Initially, referring to FIG. 4, a planar support 26, the contour of which approximates that of the support plate 1, is employed. This planar support comprises, at each location corresponding to an orifice of the support plate 1, a centering cylinder 27 which is integral with the support 26 and the longitudinal axis of which corresponds to the axis of the orifice of the support plate 1. Around this cylinder, there is an annular piece 28, the internal diameter of which corresponds to that of the cylinder 27 and the external diameter of which corresponds to the internal diameter of the male ring 16. That part of the annular piece 28 which contacts the support 26 advantageously terminates rotundly, with the radius being such that it corresponds to the radius of curvature for the connection between the cylindrical portion 19 and the flange 21 of the male ring 16. It should be noted, however, that the annular piece 28 and the cylinder 27 can optionally comprise a single piece.

At each location where there is an orifice 2 of the support plate, the following are then successively placed on the horizontally arranged support 26 described above: a male ring 16 around the annular piece 28, a membrane 15 cut out beforehand, the support plate 1, a membrane 15, the female ring 17, and the seal 18. A locking piece 29, which possesses a bore 30, the diameter of which corresponds to that of the centering cylinder 27, is then arranged around the said cylinder 27. The locking piece 29, which makes it possible to lock the male ring 16 to the female ring 17 by means of the sealing means 18 while simultaneously compressing said means 18, is shaped such that it has two cylindrical portions of differing diameters; one having a diameter 31 which is slightly smaller than the periphery of the rib 23 of the flange 22 of the female ring 17, and the other having a diameter which corresponds to the internal diameter of the cylindrical portion 19 of the male ring 16. The progression from one cylindrical portion to the other of the locking piece 29 is effected by means of a round-off 32 which permits the bending of the end of the cylindrical portion 19 of the male ring 16 to the desired degree over the sealing means 18 when the locking piece 29 and the annular piece 28 come into abutment.

Therefore, the positioning of each device according to the present invention on a support plate is effected with a simple apparatus which makes it possible to achieve a constant spacing between the flange 22 of the female ring 17 and the flange 21 of the male ring 16. The pieces 29 and 28 are brought together while these elements are arranged between the platens of a press. Advantageously, all of the devices for the leaktight attachment of the membranes of one and the same support plate 1 can be positioned simultaneously.

FIG. 5 shows a modified embodiment of the device according to the present invention for the leaktight attachment of membranes to a support plate. In order to simplify the drawing, only half of the device has been shown, but it is quite obvious that the other half, which is not shown, is symmetrical relative to the longitudinal axis of the orifice 2 of the support plate 1 in question.

In the device shown in FIG. 5, the seal 18 is not located in a notch 24 in the cylindrical portion 20 of the female ring 17 as in the device shown in FIG. 3, but is located on the flange 22 of the female ring 17, preferably in a groove 33 provided on its flange 22. When the device is mounted on a support plate, the end of the cylindrical portion 19 of the male ring 16 is bent into contact with the sealing means 18. Advantageously, between cylindrical portion 20 and the groove 33, the flange 22 of the female ring 17 is designed so that after the end of the male ring 16 has been bent into contact with sealing means 18, said end is essentially in the same plane as the flange 22 of the female ring 17 beyond the groove 33. Preferably, the flaring 11 of the support plate 1 on the same side as the female ring 17 possesses a channel 34, e.g., being circular, for the positioning of the groove 33 of said female ring 17.

FIG. 6 shows another embodiment of a device according to the present invention. In this device, the male ring 16 has a cylindrical portion 19 of a length which does not correspond to the entire thickness of the support plate 1 in the region of the flarings 11 of an orifice, in contrast to the aforedescribed devices.

The female ring 17 comprises a cylindrical portion 20 having a length which does traverse the entire width of the support plate 1 in the region of the flarings 11, the end of which comprises a preferably rounded portion 35 directed towards the interior of the orifice. The sealing means 18 is thus clamped in a leaktight manner between the rounded end 35 of the cylindrical portion 20 of the female ring 17 and the bent end of the cylindrical portion 19 of the male ring 16.

In order to further illustrate the present invention and the advantages thereof, the following specific example is given, it being understood that same is intended only as illustrative and in nowise limitative.

EXAMPLE

A device such as that shown in FIG. 3 is made of stainless steel (Z 10 CN 18/08-reference AFNOR). The thickness of the male and female stamped rings 16 and 17 is 0.5 mm. The internal diameter of the cylindrical portion 20 of the female ring 17 and the external diameter of the cylindrical portion of the male ring 16 are 67 mm. The flanges 21 and 22 of each ring have a peripheral diameter of 89 mm. The angle $\alpha$ of each ring is 4 degrees. The length of the cylindrical portion 19 of the male ring 16 is 6.6 mm before mounting on the support plate. Once the rings have been locked to one another on a support plate 1 with the O-ring seal 18 (the internal diameter of which is 66.4 mm and the cross-section of which has a diameter of 1.8 mm), the outer faces 36 of the flanges 21 and 22 of the rings 16 and 17 are 5.6 mm apart. The internal radius of curvature for connection of the flanges 21 and 22 of each ring with their corresponding adjacent cylindrical portion, 19 and 24, respectively, is 1 mm. The O-ring seal 18 employed is made of nitrile rubber of a DIDC=70 [DIDC=degre international durete caoutchouc (international degree of rubber hardness)] in accordance with AFNOR French Standard Specification T46-003, which is a standard method.

With a device of this type for the mounting of membranes onto a support plate 1, no leakage could be detected under an air pressure of 6 bars.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A device for the leaktight securing of semi-permeable membranes to opposite faces and around at least one fluid passage orifice of a membrane support plate of a separatory apparatus, the said device comprising two stamped metal rings which have flanges with means for pressing the edges of said membranes sealingly against the support plate, said rings have generally cylindrical portions which extend into said orifice from opposite ends thereof, one of said rings being a male ring and the other of said rings being a female ring, said cylindrical portions being fixed together in a leaktight manner by a gasket arranged between the rings.

2. A device according to claim 1, wherein the end of the cylindrical portion of the male ring of said two metal rings is bent in such a manner as to compress the gasket against the cylindrical portion of the female ring.

3. A device according to claim 1 or 2, wherein the female ring of said two metal rings comprises an annular depressed area which is positioned in a corresponding depressed area in the support plate.

4. A device according to claim 3, wherein the gasket is situated in the depressed area of the female ring.

5. A device according to claim 2, wherein the bent end of the cylindrical portion of the male ring is located in essentially the same plane as the flange of the female ring.

6. A device according to claim 2, wherein the cylindrical portion of the female ring has a length which traverses the entire width of the support plate at the orifice with its end being rounded in the direction of the orifice interior and the gasket being compressed against said end by the male ring cylindrical portion.

7. An apparatus which separates fluids by selective permeability comprising a plurality of planar, semi-permeable membranes and support plates therefor, the improvement comprising mounting the semi-permeable membranes to the support plates with a device as defined in claim 1 or 2.

8. A device according to claim 1, wherein the generally cylindrical portion of the female ring of said two metal rings includes first and second cylindrical portions, the second cylindrical portion being of relative enlarged diameter and being positioned in a corresponding annular notch in the support plate.

9. A device according to claim 8, wherein the gasket is situated between the male ring and the second cylindrical portion of relative enlarged diameter of said female ring.

10. A device according to claim 1, wherein the female ring of said two metal rings comprises a groove in its flange which fits into a corresponding channel in the support plate.

11. A device according to claim 10 wherein the gasket is compressed into said groove by the male ring.

12. A device according to claim 1, wherein the flange of each metal ring, prior to assembly of the device, forms an angle relative to the support plate such that when the device is mounted in the orifice, the flange deforms within the elastic limits of the metallic composition of the ring upon pressing the membranes sealingly against the support plate.

13. A device according to claim 1, wherein the composition of the metal rings comprises stainless steel.

14. A device according to claim 12, wherein the angle is between 2 and 8 degrees.

15. A device according to claim 12, wherein the angle is between 3 and 6 degrees.

16. A device according to claim 1 or 12, wherein the means for pressing the edges of the membranes comprises an internal rib arranged on the circular periphery of each of the flanges of the metal rings which rib holds the corresponding membrane to the support plate in a leaktight manner.

17. A device according to claim 1, wherein said device is assembled by an apparatus which achieves a consistent spacing between the outside faces of the flanges of the metal rings, which apparatus comprises a planar support, a centering cylinder for each orifice, the cylinder extending into the orifice and being integral with the planar support, and an annular piece for each cylinder which has an internal diameter corresponding to the external diameter of said cylinder and an external diameter corresponding to the internal diameter of the male ring of the two metal rings.

* * * * *